US012434855B2

(12) United States Patent
Umezawa et al.

(10) Patent No.: US 12,434,855 B2
(45) Date of Patent: Oct. 7, 2025

(54) AIRCRAFT

(71) Applicant: SUBARU CORPORATION, Tokyo (JP)

(72) Inventors: Sho Umezawa, Tokyo (JP); Shoichiro Sako, Tokyo (JP); Makoto Takakuwa, Tokyo (JP); Daisuke Yamaga, Tokyo (JP); Katsunori Naganuma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/689,364

(22) PCT Filed: Aug. 12, 2022

(86) PCT No.: PCT/JP2022/030800
§ 371 (c)(1),
(2) Date: Mar. 5, 2024

(87) PCT Pub. No.: WO2024/034134
PCT Pub. Date: Feb. 15, 2024

(65) Prior Publication Data
US 2025/0136290 A1    May 1, 2025

(51) Int. Cl.
*B64D 45/00* (2006.01)
*B64C 27/04* (2006.01)
(Continued)

(52) U.S. Cl.
CPC .............. *B64D 45/00* (2013.01); *B64C 27/04* (2013.01)

(58) Field of Classification Search
CPC .................................................... B64D 45/00
See application file for complete search history.

(56) References Cited

U.S. PATENT DOCUMENTS 5,465,142 A * 11/1995 Krumes ................ G01S 17/933
359/201.1
2002/0030610 A1    3/2002 Ishihara et al.
(Continued)

FOREIGN PATENT DOCUMENTS

| JP | 2003-279375 A | 10/2003 |
| JP | 2003-534987 A | 11/2003 |
| WO | 0190693 A2 | 11/2001 |

OTHER PUBLICATIONS

International Search Report received in PCT Application No. PCT/JP2022/030800, dated Nov. 1, 2022.
(Continued)

*Primary Examiner* — Davetta W Goins
*Assistant Examiner* — Pameshanand Mahase
(74) *Attorney, Agent, or Firm* — Rimon P.C.

(57) ABSTRACT

An aircraft includes a rotary wing comprising a main rotor and a tail rotor, a drive unit configured to rotate the rotary wing, an information acquirer for acquiring position information of an obstacle relative to the aircraft, a display, and a controller including at least one processor and at least one memory coupled to the processor. The processor executes processing including deriving a direction, a horizontal distance, and a vertical distance of the obstacle with respect to the aircraft, based on the position information of the obstacle, determining, for one or both of the main rotor and the tail rotor, whether the direction, the horizontal distance, and the vertical distance satisfy a first distance condition, and displaying an index corresponding to the vertical distance at a display position on the display when the first distance condition is satisfied, the display position being identified by the direction and the horizontal distance.

7 Claims, 8 Drawing Sheets

(51) Int. Cl.
    *B64D 43/00*     (2006.01)
    *B64D 45/04*     (2006.01)
    *G08G 5/80*     (2025.01)

(56) References Cited

U.S. PATENT DOCUMENTS

| | | | | |
|---|---|---|---|---|
| 2011/0241928 A1* | 10/2011 | Oswald | G01S 13/87 |
| | | | 342/90 |
| 2019/0146515 A1* | 5/2019 | De Salvo | G08G 1/166 |
| | | | 701/23 |
| 2021/0122491 A1* | 4/2021 | McNulty | B64D 43/00 |
| 2021/0254313 A1* | 8/2021 | Uemura | E02F 3/7618 |

OTHER PUBLICATIONS

Office Action dated Feb. 18, 2025, issued in corresponding Japan Patent Application No. 2023-574565, 6 pages.

* cited by examiner

TAIL ROTOR DETERMINATION CRITERIA

| DIRECTION (°) | HORIZONTAL DISTANCE (m) | VERTICAL DISTANCE (m) | FIRST LEVEL OF RISK | DIRECTION (°) | HORIZONTAL DISTANCE (m) | VERTICAL DISTANCE (m) | FIRST LEVEL OF RISK |
|---|---|---|---|---|---|---|---|
| $-165 < \theta \leq -135$ | $2.5 < l \leq 5$ | $h \leq 5$ | 3 | $+105 < \theta \leq +135$ | $2.5 < l \leq 5$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $5 < l \leq 7.5$ | $h \leq 5$ | 3 | | $5 < l \leq 7.5$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $7.5 < l \leq 10$ | $h \leq 5$ | 3 | | $7.5 < l \leq 10$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $10 < l \leq 15$ | $h \leq 5$ | 3 | | $10 < l \leq 15$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $15 < l \leq 20$ | $h \leq 5$ | 3 | | $15 < l \leq 20$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| $-135 < \theta \leq -105$ | $2.5 < l \leq 5$ | $h \leq 5$ | 3 | $+135 < \theta \leq +165$ | $2.5 < l \leq 5$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $5 < l \leq 7.5$ | $h \leq 5$ | 3 | | $5 < l \leq 7.5$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $7.5 < l \leq 10$ | $h \leq 5$ | 3 | | $7.5 < l \leq 10$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $10 < l \leq 15$ | $h \leq 5$ | 3 | | $10 < l \leq 15$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $15 < l \leq 20$ | $h \leq 5$ | 3 | | $15 < l \leq 20$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| $-105 < \theta \leq -45$ | $2.5 < l \leq 5$ | $h \leq 5$ | 3 | $+165 < \theta \leq +180$ $-180 < \theta \leq -165$ | $2.5 < l \leq 5$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $5 < l \leq 7.5$ | $h \leq 5$ | 3 | | $5 < l \leq 7.5$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $7.5 < l \leq 10$ | $h \leq 5$ | 3 | | $7.5 < l \leq 10$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $10 < l \leq 15$ | $h \leq 5$ | 3 | | $10 < l \leq 15$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $15 < l \leq 20$ | $h \leq 5$ | 3 | | $15 < l \leq 20$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| $+45 < \theta \leq +105$ | $2.5 < l \leq 5$ | $h \leq 5$ | 3 | $-180 < \theta \leq -180$ | $l \leq 2.5$ | $h \leq 5$ | 3 |
| | | $5 < h \leq 10$ | 2 | | | $5 < h \leq 10$ | 2 |
| | | $10 < h \leq 20$ | 1 | | | $10 < h \leq 20$ | 1 |
| | $5 < l \leq 7.5$ | $h \leq 5$ | 3 | | | | |
| | | $5 < h \leq 10$ | 2 | | | | |
| | | $10 < h \leq 20$ | 1 | | | | |
| | $7.5 < l \leq 10$ | $h \leq 5$ | 3 | | | | |
| | | $5 < h \leq 10$ | 2 | | | | |
| | | $10 < h \leq 20$ | 1 | | | | |
| | $10 < l \leq 15$ | $h \leq 5$ | 3 | | | | |
| | | $5 < h \leq 10$ | 2 | | | | |
| | | $10 < h \leq 20$ | 1 | | | | |
| | $15 < l \leq 20$ | $h \leq 5$ | 3 | | | | |
| | | $5 < h \leq 10$ | 2 | | | | |
| | | $10 < h \leq 20$ | 1 | | | | |

FIG. 6

MAIN ROTOR DETERMINATION CRITERIA

| DIRECTION (°) | HORIZONTAL DISTANCE (m) | VERTICAL DISTANCE (m) | FIRST LEVEL OF RISK |
|---|---|---|---|
| −135 < θ ≤ −45 | 2.5 < l ≤ 5 | h ≤ 5 | 3 |
| | | 5 < h ≤ 10 | 2 |
| | | 10 < h ≤ 20 | 1 |
| | 5 < l ≤ 7.5 | h ≤ 5 | 3 |
| | | 5 < h ≤ 10 | 2 |
| | | 10 < h ≤ 20 | 1 |
| | 7.5 < l ≤ 10 | h ≤ 5 | 3 |
| | | 5 < h ≤ 10 | 2 |
| | | 10 < h ≤ 20 | 1 |
| | 10 < l ≤ 15 | h ≤ 5 | 3 |
| | | 5 < h ≤ 10 | 2 |
| | | 10 < h ≤ 20 | 1 |
| | 15 < l ≤ 20 | h ≤ 5 | 3 |
| | | 5 < h ≤ 10 | 2 |
| | | 10 < h ≤ 20 | 1 |
| +45 < θ ≤ +135 | 2.5 < l ≤ 5 | h ≤ 5 | 3 |
| | | 5 < h ≤ 10 | 2 |
| | | 10 < h ≤ 20 | 1 |
| | 5 < l ≤ 7.5 | h ≤ 5 | 3 |
| | | 5 < h ≤ 10 | 2 |
| | | 10 < h ≤ 20 | 1 |
| | 7.5 < l ≤ 10 | h ≤ 5 | 3 |
| | | 5 < h ≤ 10 | 2 |
| | | 10 < h ≤ 20 | 1 |
| | 10 < l ≤ 15 | h ≤ 5 | 3 |
| | | 5 < h ≤ 10 | 2 |
| | | 10 < h ≤ 20 | 1 |
| | 15 < l ≤ 20 | h ≤ 5 | 3 |
| | | 5 < h ≤ 10 | 2 |
| | | 10 < h ≤ 20 | 1 |
| −180 < θ ≤ −180 | l ≤ 2.5 | h ≤ 5 | 3 |
| | | 5 < h ≤ 10 | 2 |
| | | 10 < h ≤ 20 | 1 |

AIRCRAFT

CROSS-REFERENCE TO RELATED APPLICATIONS

This application is the U.S. National Phase under 35 U.S.C. § 371 of International Application No. PCT/JP2022/030800, filed on Aug. 12, 2022.

TECHNICAL FIELD

The present invention relates to an aircraft.

BACKGROUND ART

PTL 1 discloses a technique of superimposing a pseudo-field-of-view image including obstacle ridgelines on obstacles in an actual field of view during flight of an aircraft.

CITATION LIST

Patent Literature

PTL 1: Japanese Unexamined Patent Application Publication No. 2003-279375

SUMMARY OF INVENTION

Technical Problem

Disaster rescue operations in spatially limited areas such as mountainous areas may be performed by helicopters. Such a helicopter descends toward the ground, and performs search and rescue of rescuers while hovering near the ground. Such a mountainous area has scattered obstacles, such as trees, steel towers, and cliffs, around the ground. Thus, existing automatic control is not available for security reasons, and a pilot may manually control the airframe.

However, it is difficult for the pilot in the cockpit of the helicopter to visually check conditions around the airframe, in particular, conditions behind or below the airframe. In spatially limited areas such as mountainous areas, additionally, the wind changes in direction and volume from moment to moment. Such a sudden change in weather may cause decreased visibility and the like. This may make it difficult for the pilot to maintain the altitude and the horizontal position of the helicopter. Accordingly, when the helicopter comes in close proximity to an obstacle such as a tree, a steel tower, or a cliff near the ground in a mountainous area, which is contrary to the pilot's intention, rotary wings or the airframe may make contact with the obstacle.

It is an object of the present invention to provide an aircraft that enables easy recognition of an obstacle around an airframe of the aircraft.

Solution to Problem

In order to solve the above-described problem, an aircraft of the present invention includes:
  a rotary wing comprising a main rotor and a tail rotor;
  a drive unit configured to rotate the rotary wing;
  an information acquirer configured to acquire position information of an obstacle relative to the aircraft;
  a display; and
  a controller,
  the controller including:
    one or more processors; and
    one or more memories coupled to the one or more processors,
    the one or more processors being configured to execute processing including:
    deriving a direction, a horizontal distance, and a vertical distance of the obstacle with respect to the aircraft, based on the position information of the obstacle;
    determining, for one or both of the main rotor and the tail rotor, whether the direction, the horizontal distance, and the vertical distance satisfy a first distance condition; and
    displaying an index corresponding to the vertical distance at a display position on the display when the first distance condition is satisfied, the display position being identified by the direction and the horizontal distance.

Advantageous Effects of Invention

The present invention enables easy recognition of an obstacle around an airframe.

BRIEF DESCRIPTION OF DRAWINGS

FIG. 5 is an explanatory diagram illustrating determination criteria for respective sub-regions for a tail rotor.

DESCRIPTION OF EMBODIMENTS

Hereinafter, an embodiment of the present invention will be described in detail with reference to the accompanying drawings. Specific dimensions, materials, numerical values, and the like illustrated in the embodiment are merely examples for facilitating understanding of the invention, and do not limit the present invention unless otherwise specified. In this specification and the drawings, elements having substantially the same functions and configurations are denoted by the same reference numerals, and redundant description thereof will be omitted. In addition, elements that are not directly related to the present invention will not be illustrated in the drawings.

Figure 1:
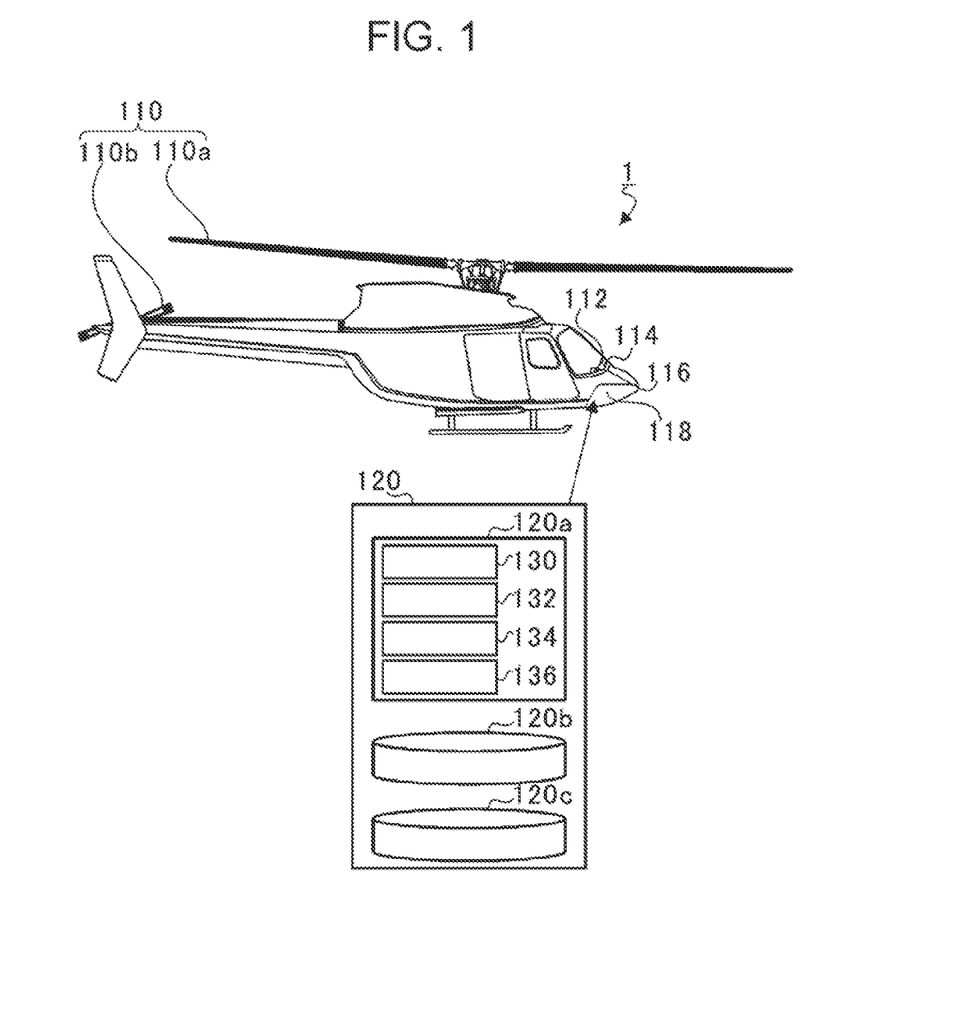
FIG. 1 is an explanatory diagram for describing a schematic configuration of an aircraft.

FIG. 1 is an explanatory diagram for describing a schematic configuration of an aircraft 1. A helicopter (rotary-wing aircraft) will be described here as the aircraft 1. The aircraft 1 includes a power mechanism 110, a display 112, a sound output unit 114, a steering unit 116, an information acquirer 118, and a controller 120.

The power mechanism 110 includes rotary wings and a drive unit. The rotary wings include a main rotor 110a and a tail rotor 110b. The main rotor 110a is disposed in an upper portion of an airframe (a portion other than the rotary wings of the aircraft 1). The tail rotor 110b is disposed in an end portion of a tail boom of the airframe. The number of rotary wings is not limited to two, but may be one or three or more. The drive unit includes, for example, a reciprocating engine, a jet engine, a motor, or the like and rotates the rotary wings. When the drive unit rotates the rotary wings, the power mechanism 110 generates lift and thrust of the aircraft 1. Further, when the drive unit rotates the rotary wings, the power mechanism 110 enables the airframe to remain stationary in the air, or hover, and enables vertical takeoff and landing of the airframe. Instead of the combination of the rotary wings and the drive unit, the power mechanism 110 may adopt a jet engine as long as the power mechanism 110 enables the airframe to remain stationary in the air.

The display 112 includes a liquid crystal display, an EL display, an LED display, or the like. A pilot can use the display 112 to visually check information to be used for flight.

The sound output unit 114 includes a headphone or an earphone of a headset, or a speaker. The pilot can use the sound output unit 114 to listen to information to be used for flight.

The steering unit 116 receives an operation input of the pilot, who controls the aircraft 1, and transmits the operation input to the controller 120. For example, when the pilot tilts a stick-shaped control stick, which is an example of the steering unit 116, forward or backward, the amount of operation of the control stick is transmitted to the controller 120.

The information acquirer 118 acquires flight information based on the flight of the aircraft 1 and environmental information of a region in which the aircraft 1 is flying. For example, the information acquirer 118 uses the GPS (Global Positioning System) or the like to acquire an absolute location of the aircraft 1, which is flying, in longitude, latitude, and altitude, for example. The information acquirer 118 further uses an inertial navigation system to acquire the attitude and the ground speed of the aircraft 1. The information acquirer 118 further uses a pressure sensor such as a pitot tube to acquire the pressure altitude and the airspeed of the aircraft 1.

The information acquirer 118 further uses any one of a LiDAR, a visible camera, and an infrared camera, or a combination thereof to acquire position information of an obstacle present around the aircraft 1. Instead of a LiDAR, a visible camera, and/or an infrared camera, the information acquirer 118 may adopt various electronic devices capable of deriving a relative distance from the airframe. The relative distance from the airframe may be determined by using various existing techniques, which will not be described in detail herein.

The information acquirer 118 further acquires the weather, temperature, pressure, and the like of the region in which the aircraft 1 is flying, based on weather information reported by the Meteorological Agency and the position information of the aircraft 1.

The controller 120 includes a semiconductor integrated circuit and manages and controls the entire aircraft 1. The semiconductor integrated circuit includes a processor 120a, a ROM 120b that stores a program and the like, a RAM 120c serving as a work area, and so on. The ROM 120b and the RAM 120c may be collectively referred to as a memory. For example, the controller 120 causes the power mechanism 110 to change the altitude, the horizontal position, and the attitude of the airframe in accordance with the amount of operation acquired from the steering unit 116. Further, the controller 120 serves as a position deriver 130, a distance condition determiner 132, a display controller 134, and an output controller 136 in cooperation with a program, as will be described below. Here, as an example, the single controller 120 is used to change the altitude, the horizontal position, and the attitude of the airframe, and serves as the position deriver 130, the distance condition determiner 132, the display controller 134, and the output controller 136. As another example, multiple controllers may be used to individually change each of the altitude, the horizontal position, and the attitude of the airframe, and may individually serve as the position deriver 130, the distance condition determiner 132, the display controller 134, and the output controller 136. The respective functional units will be described in detail below.

The aircraft 1 having the configuration described above may perform disaster rescue operations in spatially limited areas such as mountainous areas. At this time, the aircraft 1 descends toward the ground, and performs search and rescue of rescuers while hovering near the ground. Such a mountainous area has scattered obstacles, such as trees, steel towers, and cliffs, around the ground. Existing automatic control is not available for security reasons, and accordingly the pilot performs manual control. However, it is difficult for the pilot in the cockpit of the aircraft 1 to visually check conditions around the airframe, in particular, conditions behind or below the airframe. In spatially limited areas such as mountainous areas, additionally, the wind changes in direction and volume from moment to moment. Such a sudden change in weather may cause decreased visibility and the like. This may make it difficult for the pilot to maintain the altitude and the horizontal position of the helicopter. When the helicopter comes in close proximity to an obstacle such as a tree, a steel tower, or a cliff near the ground in a mountainous area, which is contrary to the pilot's intention, rotary wings or part of the airframe may make contact with the obstacle. Accordingly, it is an object of the present embodiment to allow the pilot to easily recognize an obstacle around the airframe through the display 112 and the sound output unit 113.

Figure 2:
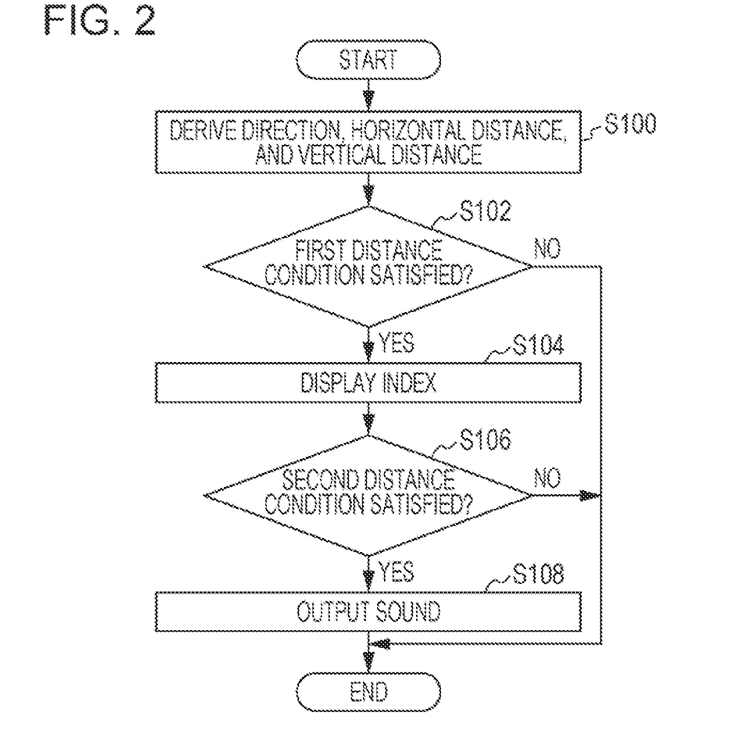
FIG. 2 is a flowchart illustrating the flow of a process of functional units in a controller.

FIG. 2 is a flowchart illustrating the flow of a process of the functional units in the controller 120. The functional units execute the process at timings of interrupts executed at predetermined intervals.

The position deriver 130 derives a direction $\theta$, a horizontal distance l, and a vertical distance h of an obstacle with respect to the aircraft 1, based on position information of the obstacle acquired by the information acquirer 118 (S100). The direction $\theta$ is represented by an angle on a horizontal plane with respect to the heading. The horizontal distance l is represented by a relative distance between the aircraft 1 and the obstacle in the horizontal direction. The vertical distance h is represented by a relative distance between the aircraft 1 and the obstacle in the vertical direction. For example, a LiDAR serving as the information acquirer 118 is installed at an intermediate position between the main rotor 110a and the tail rotor 110b. Thus, the position deriver 130 performs coordinate transformation on the position information with respect to the intermediate position to obtain position information with respect to the center of rotation of the main rotor 110a. If the LiDAR has a detection axis different from the body axis, the position deriver 130 performs multiplication by a rotation matrix so that the detection axis of the LiDAR coincides with the body axis, and further performs multiplication by a displacement matrix so that the position of installation of the information acquirer 118 coincides with the center of rotation of the main rotor 110a. Then, the position deriver 130 derives the direction θ, the horizontal distance l, and the vertical distance h of the obstacle with respect to the center of rotation of the main rotor 110a, based on the position information obtained by the coordinate transformation.

Note that the horizontal distance l is not a relative distance from the center of rotation of the main rotor 110a, but a value obtained by subtracting the length of a blade of the main rotor 110a, that is, the radius of gyration of the main rotor 110a, from the relative distance. This is because the portion that would make contact with the obstacle is not the center of rotation of the main rotor 110a, but a blade tip of the main rotor 110a. Note that the vertical distance h is a relative distance from the center of rotation of the main rotor 110a. Alternatively, the vertical distance h may be a value obtained by subtracting the distance between the center of rotation of the main rotor 110a and the bottom of the airframe from the relative distance.

The position deriver 130 further performs coordinate transformation on the position information with respect to the intermediate position between the main rotor 110a and the tail rotor 110b to obtain position information with respect to the center of rotation of the tail rotor 110b. The position deriver 130 derives the direction θ, the horizontal distance l, and the vertical distance h of the obstacle with respect to the center of rotation of the tail rotor 110b, based on the position information obtained by the coordinate transformation.

The distance condition determiner 132 determines whether the direction θ, the horizontal distance l, and the vertical distance h of the obstacle, which are derived by the position deriver 130, satisfy a first distance condition that is a condition related to the direction and the distances (S102).

In the manual control, the pilot is able to visually recognize an obstacle in the heading direction with the naked eye, whereas an obstacle in a blind spot behind or below the pilot is difficult to visually recognize. In the present embodiment, accordingly, the direction θ with respect to the heading is set to 0°, and a predetermined angle range larger than −90° and smaller than +90°, for example, a range given by −45°<θ≤+45°, is not included in a determination target range. That is, the distance condition determiner 132 uses a range given by −180°<θ≤−45° and +45°<θ≤+180° as the determination target range. The angles not included in the determination target range are not limited to those in the range given by −45°<θ≤+45°, and can be set as desired.

This configuration allows the pilot to visually recognize an obstacle in the heading direction with the naked eye and to grasp an obstacle in a blind spot behind or below the pilot through the display 112. Since the heading direction is not used as the determination target range, the pilot can concentrate on visually recognizing an obstacle in the heading direction with the naked eye.

The range used as the determination target range is different between the main rotor 110a and the tail rotor 110b. For example, the distance condition determiner 132 uses, as the determination target range for the main rotor 110a, a range given by −135°<θ≤−45° and +45°<θ≤+135°. The distance condition determiner 132 uses, as the determination target range for the tail rotor 110b, the range given by −180°<θ≤−45° and +45°<θ≤+180°.

This is because if an obstacle is present in a range given by −180°<θ≤−135° and +135°<θ≤+180° with respect to the main rotor 110a, it is more likely that the tail rotor 110b will make contact with the obstacle before the main rotor 110a does. Accordingly, the range given by −180°<θ≤−135° and +135°<θ≤+180° with respect to the main rotor 110a, which is less likely to be associated with the determination, is excluded from the determination target range. The angles to be excluded from the determination target range for the main rotor 110a are not limited to those in the range given by −180°<θ≤−135° and +135°<θ≤+180°, and can be set as desired.

If an obstacle is in close proximity to an area below the airframe, part of the airframe may make contact with the obstacle, regardless of whether the area is below the main rotor 110a or the tail rotor 110b. Accordingly, the distance condition determiner 132 uses, for a range less than or equal to 2.5 m in the horizontal direction, an entire range, that is, a range given by −180°<θ≤+180°, as the determination target range. However, even for the range less than or equal to 2.5 m in the horizontal direction, like a range larger than 2.5 m, the range given by −45°<θ≤+45° may be removed from the determination target range. In the present embodiment, an attention image 112a of the determination target range as described above is formed and displayed on the display 112.

Figure 3:
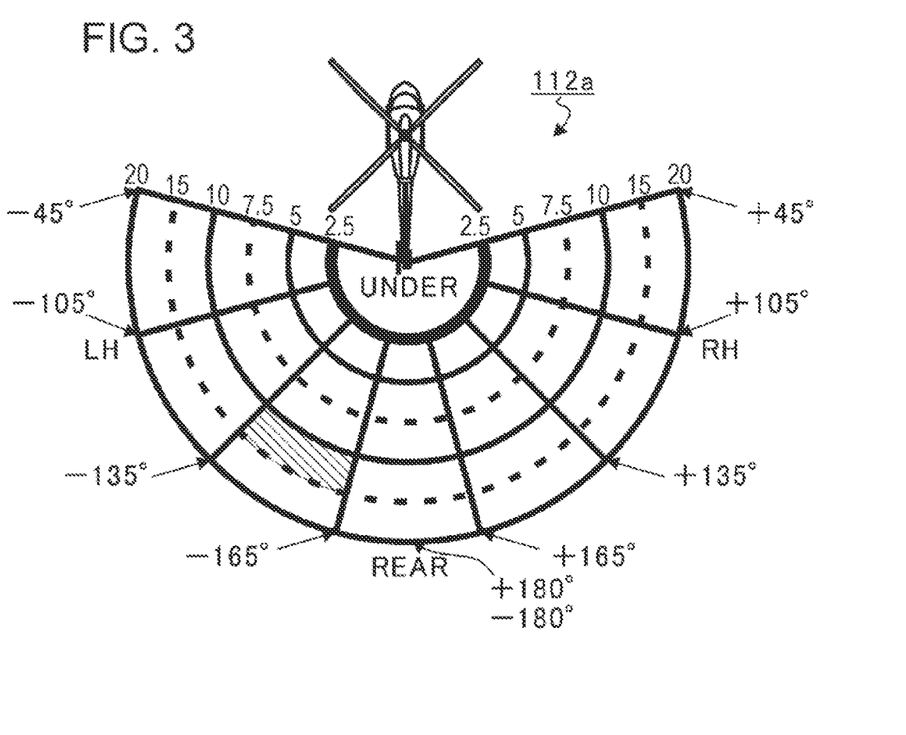
FIG. 3 is an explanatory diagram illustrating a display mode of an attention image on a display.
Figure 4:
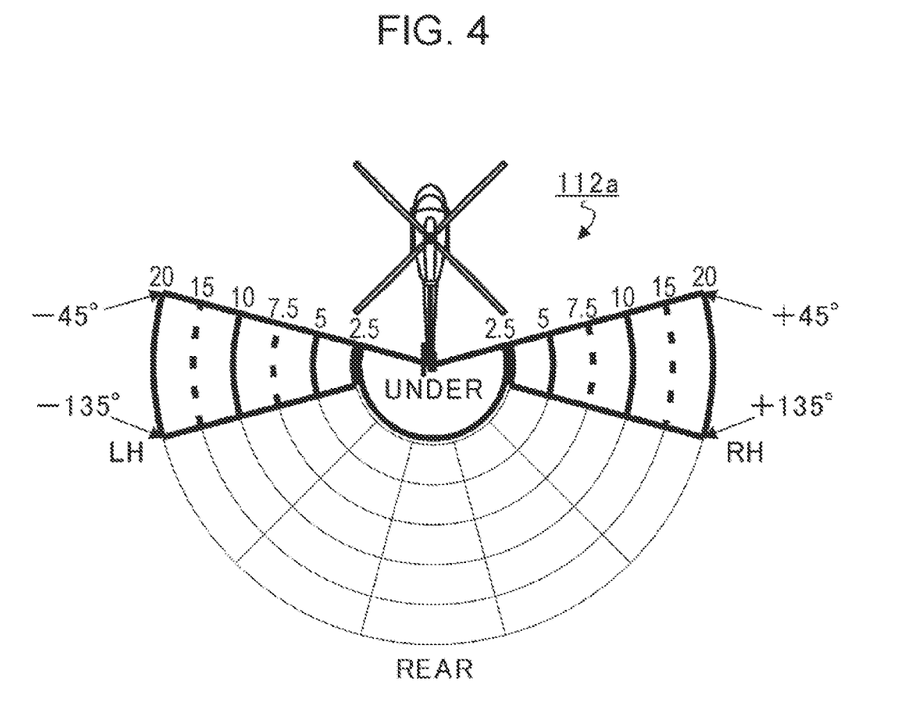
FIG. 4 is an explanatory diagram illustrating a display mode of an attention image on the display.

FIG. 3 and FIG. 4 are explanatory diagrams illustrating display modes of the attention image 112a on the display 112. FIG. 3 illustrates a display mode of the attention image 112a for the tail rotor 110b. FIG. 4 illustrates a display mode of the attention image 112a for the main rotor 110a. In FIG. 3 and FIG. 4, angles are indicated by arrows for convenience of illustration. Such indications are not actually displayed in the attention image 112a. As described above, for both of the main rotor 110a and the tail rotor 110b, the range given by −45°<θ≤+45° from the heading, except for the close proximity to areas therebelow, is excluded from the determination target range. In the attention image 112a, accordingly, a target range for determination of obstacles is limited to the range given by −180°<θ≤−45° and +45°<θ≤+180°.

As illustrated in FIG. 3, a range given by −180°<θ≤−105° and +105°<θ≤+180° of the tail rotor 110b is represented such that the actual directions θ with respect to the center of rotation of the tail rotor 110b are equal to the angles displayed in the attention image 112a. For a range given by −105°<θ≤−45° and +45°<θ≤+105° of the tail rotor 110b, however, the actual directions θ with respect to the center of rotation of the tail rotor 110b are different from the angles displayed in the attention image 112a. In one example, the directions θ of actual −45° and +45° are represented by −75° and +75° in the attention image 112a. This gives higher priority to the ease of visibility by the pilot than to accurately indicating the direction θ.

As illustrated in FIG. 4, for a range given by −45°<θ≤−135° and +45°<θ≤+135° of the main rotor 110a, the actual directions θ with respect to the center of rotation of the main rotor 110a are different from the angles displayed in the attention image 112a. In one example, the directions θ of actual −45° and 45° are represented by −75° and +75° in the attention image 112a, and the actual directions θ of −135° and +135° are represented by −105° and +105° in the attention image 112a. This gives higher priority to the ease of visibility by the pilot than to the actual directions θ.

Further, the indications for the main rotor 110a illustrated in FIG. 4 are superimposed on the indications for the tail rotor 110b illustrated in FIG. 3. As described above, integration of display positions for the main rotor 110a with display positions for the tail rotor 110b allows the pilot to quickly and intuitively grasp an obstacle in the lateral direction regardless of the main rotor 110a or the tail rotor 110b.

Here, as illustrated in FIG. 3 and FIG. 4, the target range for determination of obstacles is limited to the range given by $-180°<\theta\leq-45°$ and $+45°<\theta\leq+180°$, and the display range is limited to a range given by $-180°<\theta\leq-75°$ and $+75°<\theta\leq+180°$. As a result, non-obstacle information can be displayed in a region given by $-75°<\theta\leq+75°$ in the attention image 112a. Here, an image of the aircraft 1 is displayed in the display range, and the center of the attention image 112a is made to coincide with the center of rotation of the tail rotor 110b. This allows the pilot to visually recognize that information on an obstacle behind or below the aircraft 1 is displayed and that at least the center of rotation of the tail rotor 110b is used as a reference. As another example, any information such as information on the heading direction may be displayed.

Further, for the range given by $-180°<\theta\leq+180°$ in close proximity to areas below the main rotor 110a and the tail rotor 110b, the actual directions $\theta$ with respect to the centers of rotation of the main rotor 110a and the tail rotor 110b are different from the angles displayed in the attention image 112a. In one example, the direction $\theta$ of actual 0° is represented by $-75°$ and $+75°$ in the attention image 112a. This gives higher priority to the ease of visibility by the pilot than to accurately indicating the direction $\theta$. Further, the attention image 112a can display other information in $-75°<\theta\leq+75°$.

The target range described above is divided into sub-regions in the attention image 112a in accordance with the direction and the horizontal distance l. In the example of FIG. 3 and FIG. 4, the target range is radially divided into seven sections in accordance with the direction $\theta$, and is concentrically divided into six sections in accordance with the horizontal distance l.

For example, as illustrated in FIG. 3, the target range for the tail rotor 110b is radially divided into sections given by $-165°<\theta\leq-135°$, $-135°<\theta\leq-105°$, $-105°<\theta\leq-45°$, $+45°<\theta\leq+105°$, $+105°<\theta\leq+135°$, $+135°<\theta\leq+165°$, and ($+165°<\theta\leq+180°$ and $-180°<\theta\leq-165°$). Further, the target range for the tail rotor 110b is concentrically divided into sections given by 2.5 m<l≤5 m, 5 m<l≤7.5 m, 7.5 m<l≤10 m, 10 m<l≤15 m, and 15 m<l≤20 m. The regions obtained by the divisions in the way described above form respective sub-regions. The attention image 112a has at the center thereof a concentric sub-region that is given by 0 m<l≤2.5 m and that radially covers the entire range, that is, the range given by $-180°<\theta\leq+180°$. In the example of FIG. 3, the target range is divided by black lines on white background, for convenience of illustration. The actual target range is divided by white lines on black background. However, the background and line colors are not limited to the colors described above, and may be set as desired.

Further, the sub-region at the center of the attention image 112a is labeled with the text "UNDER". This allows the pilot to easily grasp that the sub-region indicates the area below the airframe. The attention image 112a represents the text "LH" representing the left direction. This allows the pilot to easily grasp that this direction indicates the left direction of the airframe. The attention image 112a represents the text "RH" representing the right direction. This allows the pilot to easily grasp that this direction indicates the right direction of the airframe. The attention image 112a represents the text "REAR" in a lower portion thereof. This allows the pilot to easily grasp that this direction indicates the rear direction of the airframe. The attention image 112a represents numerical values "2.5", "5", "7.5", "10", "15", and "20" in an upper portion thereof so as to correspond to concentric circles. This allows the pilot to easily grasp what horizontal distance l each concentric circle indicates. Further, the concentric circles may be set to have different styles such that adjacent concentric circles are depicted by different lines such as a solid line and a broken line. This allows the pilot to easily determine what horizontal distance l each concentric circle indicates.

As illustrated in FIG. 4, the target range for the main rotor 110a is radially divided into sections given by $-135°<\theta\leq-45°$ and $+45°<\theta\leq+135°$, and is concentrically divided into sections given by 2.5 m<l≤5 m, 5 m<l≤7.5 m, 7.5 m<l≤10 m, 10 m<l≤15 m, and 15 m<l≤20 m. Further, the target range has at the center thereof a concentric sub-region that is given by 0 m<l≤2.5 m and that radially covers the entire range, that is, the range given by $-180°<\theta\leq+180°$.

The directions $\theta$ into which the target range for either of the main rotor 110a and the tail rotor 110b is divided, and the number thereof, and the horizontal distances l into which the target range for either of the main rotor 110a and the tail rotor 110b is divided, and the number thereof can be set as desired.

The distance condition determiner 132 determines whether the direction $\theta$, the horizontal distance l, and the vertical distance h of the obstacle satisfy the first distance condition. In one example, the distance condition determiner 132 determines the vertical distance h for each sub-region identified by the direction $\theta$ and the horizontal distance l of the obstacle.

FIG. 5 is an explanatory diagram illustrating determination criteria for the respective sub-regions for the tail rotor 110b. The first distance condition for the tail rotor 110b is implemented by a combination of the direction $\theta$, the horizontal distance l, and the vertical distance h in FIG. 5. The example of FIG. 5 defines, as the first distance condition for the tail rotor 110b, 108 combinations such as a combination of $-165°<\theta\leq-135°$, 2.5 m<l≤5 m, and h≤5 m, for example. Referring to FIG. 5, based on the criteria for the tail rotor 110b, the distance condition determiner 132 determines that a first level of risk is 3 when the vertical distance h satisfies h≤5 m, determines that the first level of risk is 2 when the vertical distance h satisfies 5 m<h≤10 m, and determines that the first level of risk is 1 when the vertical distance h satisfies 10 m<h≤20 m, regardless of the direction $\theta$ and the horizontal distance l of the obstacle. When the vertical distance h satisfies 20 m<h, the distance condition determiner 132 determines that the first level of risk is 0. The first level of risk is represented by 0 to 3, with a higher numerical value indicating a higher probability that the aircraft 1 will make contact with the obstacle. The foregoing example has been described in which the first level of risk is identified in accordance with the vertical distance h regardless of the direction $\theta$ and the horizontal distance l of an obstacle. However, as another example, different first levels of risk may be identified for the respective sub-regions, that is, in accordance with the direction $\theta$ and the horizontal distance l of an obstacle. The first distance condition for the tail rotor 110b is not limited to that in the example of FIG. 5, and can be defined by various combinations of any directions $\theta$, any horizontal distances l, and any vertical distances h.

Figure 6:
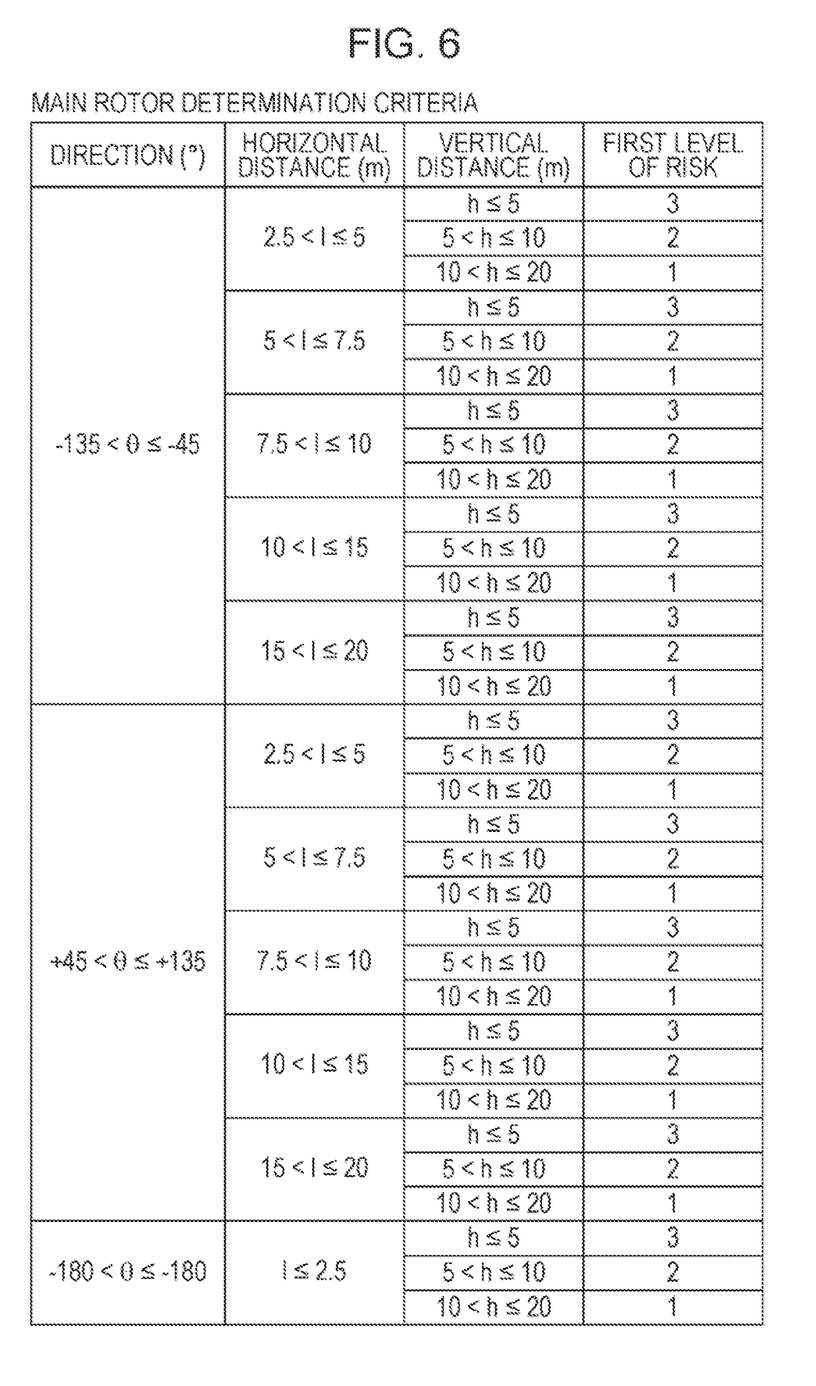
FIG. 6 is an explanatory diagram illustrating determination criteria for respective sub-regions for a main rotor.

FIG. 6 is an explanatory diagram illustrating determination criteria for the respective sub-regions for the main rotor 110a. The first distance condition for the main rotor 110a is implemented by a combination of the direction $\theta$, the horizontal distance l, and the vertical distance h in FIG. 6. The example of FIG. 6 defines, as the first distance condition for the main rotor 110a, 33 combinations such as a combination of $-135°<\theta\leq-45°$, 2.5 m<l≤5 m, and h≤5 m, for example. Referring to FIG. 6, like the tail rotor 110b, based on the criteria for the main rotor 110a, the distance condition determiner 132 determines that the first level of risk is 3 when the vertical distance h satisfies h≤5 m, determines that the first level of risk is 2 when the vertical distance h satisfies 5 m<h≤10 m, and determines that the first level of risk is 1 when the vertical distance h satisfies 10 m<h≤20 m, regardless of the direction θ and the horizontal distance l of the obstacle. When the vertical distance h satisfies 20 m<h, the distance condition determiner 132 determines that the first level of risk is 0. The foregoing example has been described in which the first level of risk is identified in accordance with the vertical distance h regardless of the direction θ and the horizontal distance l of an obstacle. However, as another example, different first levels of risk may be identified for the respective sub-regions, that is, in accordance with the direction θ and the horizontal distance l of an obstacle. The first distance condition for the main rotor 110a is not limited to that in the example of FIG. 6, and can be defined by various combinations of any directions θ, any horizontal distances l, and any vertical distances h.

Referring back to FIG. 2, if the first distance condition is not satisfied (NO in S102), the display controller 134 ends the process of FIG. 2. If the first distance condition is satisfied (YES in S102), the display controller 134 displays the index corresponding to the vertical distance h at the display position identified by the direction θ and the horizontal distance l in the attention image 112a (S104). As the display position, a sub-region identified by the direction θ and the horizontal distance l will be described. As the index, a display color corresponding to the first level of risk will be described.

If the distance condition determiner 132 identifies the first level of risk in accordance with the direction θ, the horizontal distance l, and the vertical distance h of the obstacle, the display controller 134 causes the entire sub-region identified by the direction θ and the horizontal distance l to emit light of a display color corresponding to the first level of risk. Examples of the display color include red, yellow, green, and black, which correspond to first levels of risk of 3, 2, 1, and 0, respectively. For example, if an obstacle is present at a position given by −165°<θ≤−135°, 10 m<l≤15 m, and 10 m<h≤20 m with respect to the tail rotor 110b, the distance condition determiner 132 determines that the first level of risk is 1 with reference to FIG. 5. Accordingly, as indicated by hatching in FIG. 3, the display controller 134 causes the entire sub-region given by −165°<θ≤−135° and 10 m<l≤15 m in the attention image 112a to emit light of green corresponding to a first level of risk of 1. It takes time for the pilot to grasp a specific size and shape of the obstacle if they desire to do so. Simply displaying the vertical distance h of the obstacle in a display color corresponding to the distance allows the pilot to quickly and intuitively grasp the distance to the obstacle.

As described above, the configuration of causing a sub-region of the attention image 112a to emit light of a display color corresponding to the first level of risk achieves the following effects: If no obstacle is present or if an obstacle is present but the vertical distance h thereof is larger than 20 m, the attention image 112a displays black color, which is associated with no danger. Thus, the pilot does not worry about the conditions below and behind the aircraft 1. If a sub-region is displayed in a color other than black, in contrast, this indicates that an obstacle is present at a position corresponding to the sub-region. Thus, the pilot can pay attention to the corresponding direction θ and horizontal distance l. In addition, since the display color changes in accordance with the vertical distance h of the obstacle, the pilot can intuitively recognize the vertical distance h of the obstacle. This allows the pilot to easily recognize a surrounding obstacle while viewing in the heading direction with the naked eye.

Further, as described above, the indications for both the main rotor 110a and the tail rotor 110b m are superimposed on each other in the attention image 112a within a region having display angles of −105° to −75° and +75° to +105° and a display horizontal distance of 2.5 m to 20 m and within a region having a display angle of −180° to +180° and a display horizontal distance of 0 m to 2.5 m. Accordingly, if an obstacle is present for any one of the main rotor 110a and the tail rotor 110b, the corresponding sub-region has a display color corresponding to the corresponding one of the first levels of risk. If an obstacle is present for both the main rotor 110a and the tail rotor 110b, the corresponding sub-region has a display color corresponding to a shorter one of the vertical distances h, that is, a higher one of the first levels of risk.

Since the center of rotation of the main rotor 110a and the center of rotation of the tail rotor 110b are located at different positions, different horizontal distances l may be obtained for the same obstacle. In this case, even for the same obstacle, a display color corresponding to the level of risk of the obstacle may be displayed in different sub-regions.

Referring back to FIG. 2, the distance condition determiner 132 determines whether the horizontal distance l and the vertical distance h derived by the position deriver 130 satisfy a second distance condition that is a condition related to the direction and the distances (S106). The second distance condition is implemented by a combination of the horizontal distance l and the vertical distance h in FIG. 7, which will be described below. Here, three combinations such as a combination of 2.5 m<l≤5 m and h≤5 m, for example, are defined as the second distance condition.

Figure 7:
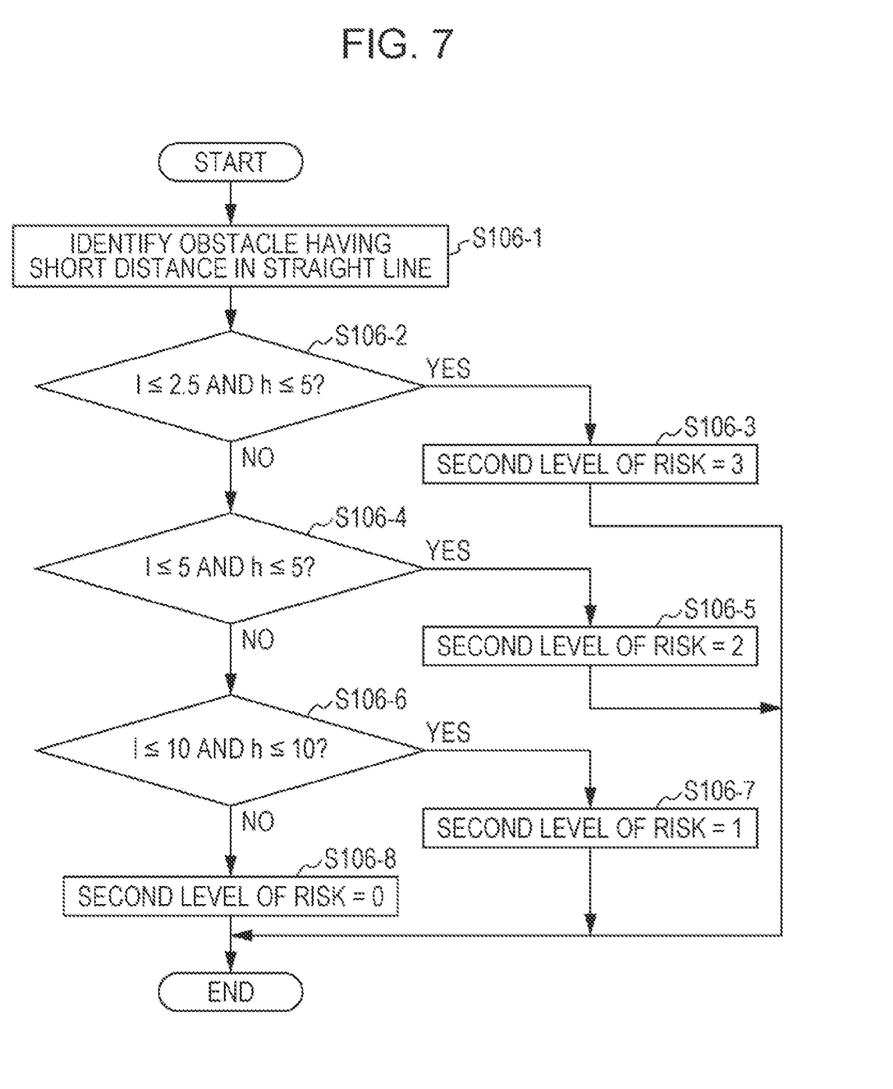
FIG. 7 is a flowchart illustrating the flow of a determination process of a distance condition determiner.

FIG. 7 is a flowchart illustrating the flow of the determination process S106 of the distance condition determiner 132. The distance condition determiner 132 identifies, among obstacles with respect to the main rotor 110a and the tail rotor 110b, an obstacle for which the distance in a straight line, that is, $\sqrt{((\text{horizontal distance l})^2+(\text{vertical distance h})^2)}$, is shortest (S106-1). Then, the distance condition determiner 132 determines whether the identified obstacle satisfies a first condition of the horizontal distance l≤2.5 m with respect to the main rotor 110a, the vertical distance h≤5 m with respect to the main rotor 110a, the horizontal distance l≤2.5 m with respect to the tail rotor 110b, and the vertical distance h≤5 m with respect to the tail rotor 110b (S106-2). If the first condition is satisfied (YES in S106-2), it is determined that a second level of risk is 3 (S106-3). Then, the determination process S106 ends.

If the first condition is not satisfied (NO in S106-2), the distance condition determiner 132 determines whether the identified obstacle satisfies a second condition of the horizontal distance l≤5 m with respect to the main rotor 110a, the vertical distance h≤5 m with respect to the main rotor 110a, the horizontal distance l≤5 m with respect to the tail rotor 110b, and the vertical distance h≤5 m with respect to the tail rotor 110b (S106-4). If the second condition is satisfied (YES in S106-4), it is determined that the second level of risk is 2 (S106-5). Then, the determination process S106 ends.

If the second condition is not satisfied (NO in S104-6), the distance condition determiner 132 determines whether the identified obstacle satisfies a third condition of the horizontal distance l≤10 m with respect to the main rotor 110a, the vertical distance h≤10 m with respect to the main rotor 110a, the horizontal distance l≤10 m with respect to the tail rotor 110b, and the vertical distance h≤10 m with respect to the tail rotor 110b (S106-6). If the third condition is satisfied (YES in S106-6), it is determined that the second level of risk is 1 (S106-7).

Then, the determination process S106 ends. If the third condition is not satisfied (NO in S106-6), the distance condition determiner 132 determines that the second level of risk is 0 (S106-8). Then, the determination process S106 ends. The second distance condition is not limited to that in the example of FIG. 7, and can be defined by various combinations of any horizontal distances l and any vertical distances h.

Referring back to FIG. 2, if the horizontal distance l and the vertical distance h do not satisfy the second distance condition (NO in S106), the output controller 136 ends the process of FIG. 2. If the horizontal distance l and the vertical distance h satisfy the second distance condition (YES in S106), the output controller 136 causes the sound output unit 114 to output a sound corresponding to the horizontal distance l and the vertical distance h (S108). Examples of the sound include a sound with a high volume, a sound with a medium volume, a sound with a low volume, and silence, which correspond to second levels of risk of 3, 2, 1, and 0, respectively. For example, if an obstacle is present at a horizontal distance l≤2.5 m and a vertical distance h≤5 m with respect to the main rotor 110a and the tail rotor 110b, the distance condition determiner 132 determines that the second level of risk is 3. As a result, the output controller 136 causes the sound output unit 114 to output a sound such as a beep with a high volume.

The foregoing example has been described in which the sound volume is changed for the second level of risk. However, as another example, various elements that allow a person to determine a difference in sound, such as the sound type, the sound frequency, the sound quality, and the voice, are applicable.

The configuration of causing the sound output unit 114 to output a sound in accordance with the second level of risk achieves the following effects: If no obstacle is present or if an obstacle is present but the vertical distance h thereof is larger than 10 m, no sound is output. Thus, the pilot does not worry about the conditions below and behind the aircraft 1. If a certain sound is output, in contrast, this indicates that an obstacle is present at a position corresponding to the sound volume. Thus, the pilot can pay attention to an obstacle behind or below the aircraft 1. In addition, since the sound volume changes in accordance with the horizontal distance l and the vertical distance h of the obstacle, the pilot can intuitively recognize the horizontal distance l and the vertical distance h of the obstacle. This allows the pilot to easily recognize a surrounding obstacle while viewing in the heading direction with the naked eye.

The foregoing example has been described in which if the horizontal distance l and the vertical distance h satisfy the second distance condition, the output controller 136 causes the sound output unit 114 to output a sound corresponding to the horizontal distance l and the vertical distance h regardless of the direction of the obstacle. However, as another example, for example, multiple sound output units 114 may be disposed behind the cockpit so as to be spaced apart from each other in the horizontal direction. In this case, if the horizontal distance l and the vertical distance h satisfy the second distance condition, the output controller 136 may cause the sound output unit 114 corresponding to the direction θ of the obstacle to output a sound corresponding to the horizontal distance l and the vertical distance h. This configuration allows the pilot to intuitively recognize the horizontal distance l and the vertical distance h of the obstacle and also the direction θ of the obstacle.

Figure 8:
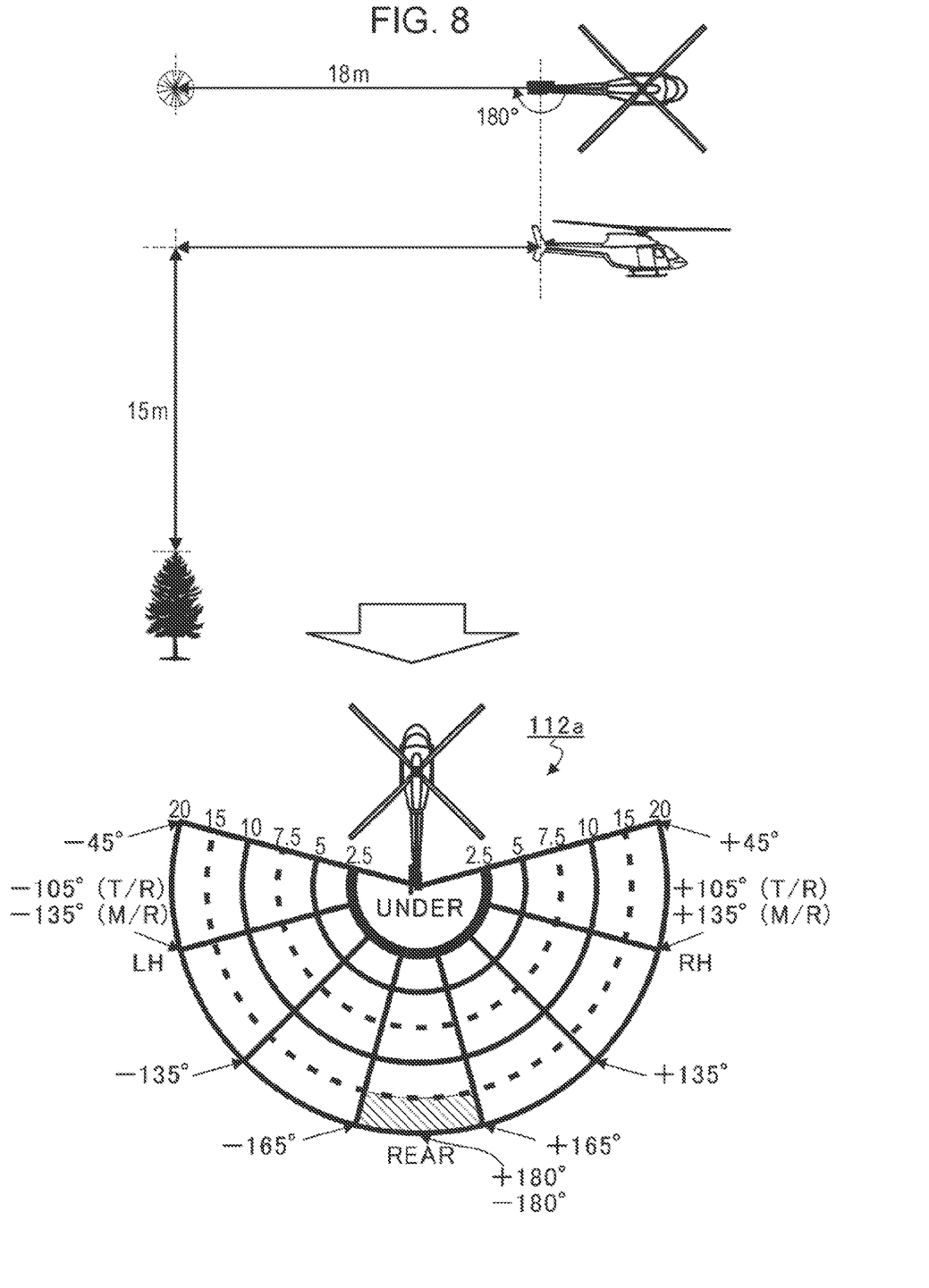
FIG. 8 illustrates, by example, processing performed for an obstacle.
Figure 9:
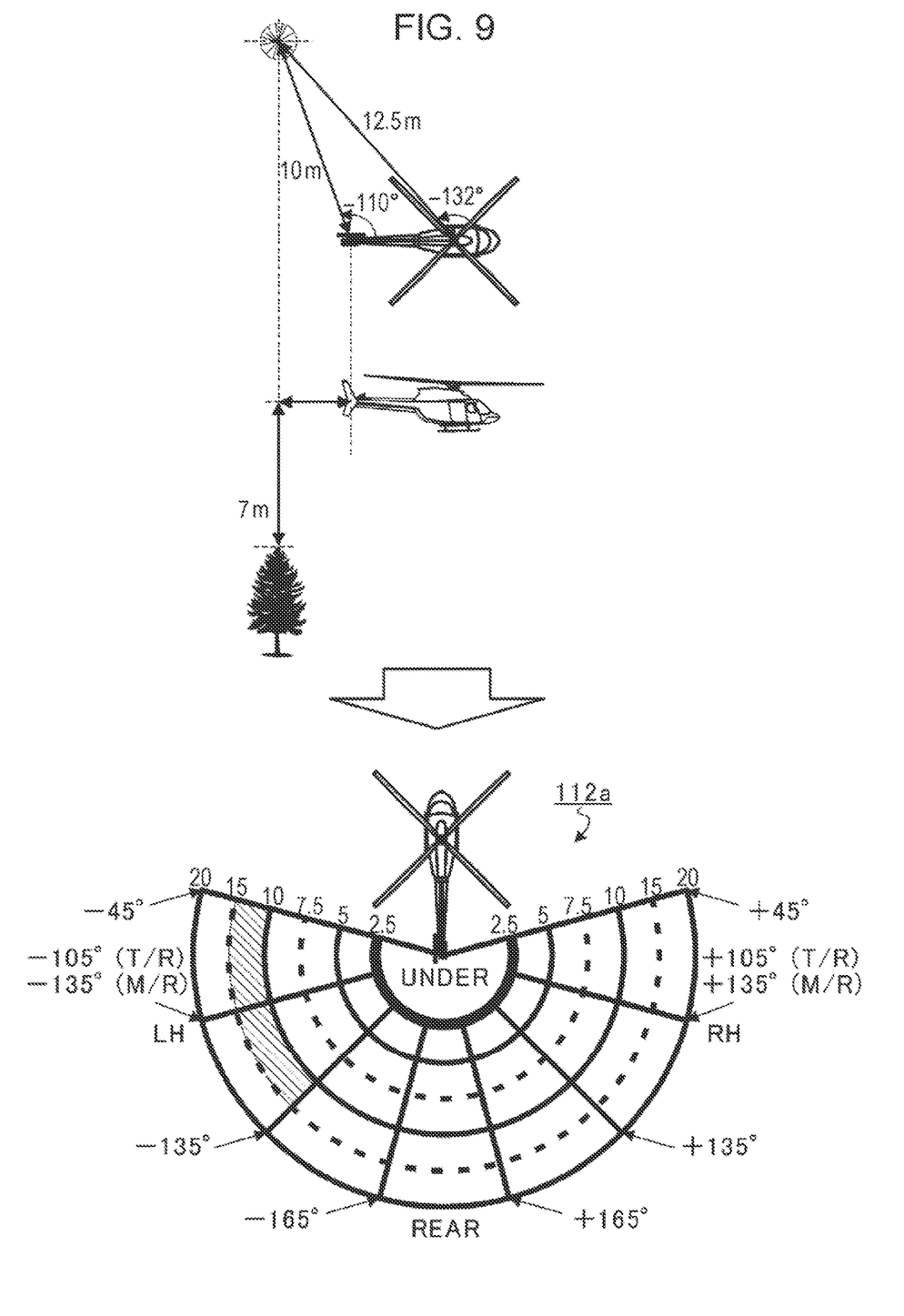
FIG. 9 illustrates, by example, processing performed for an obstacle.

FIG. 8 and FIG. 9 illustrate, by example, processing performed for an obstacle. For example, as illustrated in FIG. 8, the top of a tree, which is an obstacle, is assumed to be present at a position indicated by a direction θ of 180°, a horizontal distance l of 18 m, and a vertical distance h of 15 m with respect to the tail rotor 110b. In this case, as illustrated in FIG. 8, the display controller 134 causes the entire sub-region given by (+165°<θ≤+180° and −180°<θ≤−165°) and 15 m<l≤20 m to emit light of green corresponding to a first level of risk of 1. Since the second distance condition is not satisfied, the output controller 136 does not cause the sound output unit 114 to output any sound. In this case, the pilot can avoid the obstacle by moving the aircraft 1 forward or increasing the altitude.

As illustrated in FIG. 9, the top of a tree, which is an obstacle, is assumed to be present at a position indicated by a direction θ of −110°, a horizontal distance l of 10 m, and a vertical distance h of 7 m with respect to the tail rotor 110b. In this case, as illustrated in FIG. 9, the display controller 134 causes the entire sub-region given by −135°<θ≤−105° and 10 m<l≤15 m with respect to the tail rotor 110b to emit light of yellow corresponding to a first level of risk of 2. Further, the top of the tree is present in a direction θ of −132° at a horizontal distance l of 12.5 m and a vertical distance h of 7 m with respect to the main rotor 110a. In this case, as illustrated in FIG. 9, the display controller 134 causes the entire sub-region given by −135°<θ≤−45° and 10 m<l≤15 m with respect to the main rotor 110a to emit light of yellow corresponding to a first level of risk of 2. It can be understood that the same obstacle is displayed using two sub-regions.

Since the position of the obstacle satisfies the third condition of the horizontal distance l≤10 m with respect to the tail rotor 110b and the vertical distance h≤10 m with respect to the tail rotor 110b, the output controller 136 causes the sound output unit 114 to output the sound corresponding to a second level of risk of 1. In this case, the pilot can avoid the obstacle by moving the aircraft 1 forward to the right or increasing the altitude.

For example, a LiDAR serving as the information acquirer 118 is installed at an intermediate position between the main rotor 110a and the tail rotor 110b. Thus, the LiDAR determines a structure forming the aircraft 1, for example, the tail rotor 110b itself, as well as an actual obstacle, as an obstacle. In this case, the position deriver 130 constantly derives the horizontal distance l and the vertical distance h of the structure forming the aircraft 1 as those of an obstacle.

To address this, the distance condition determiner 132 excludes the obstacle corresponding to the structure forming the aircraft 1 from the objects to be displayed in the attention image 112a. With this configuration, the structure forming the aircraft 1 is not determined as an obstacle. Thus, an actual obstacle can be accurately and correctly extracted.

When the weather is rain, fog, hail, snow, dust, leaves, petals, or the like, for example, a LiDAR serving as the information acquirer 118 may determine, as an obstacle, a floating object floating in the air that does not affect the flight of the aircraft 1 even if the rotary wings and the airframe make contact with the floating object, such as rain, fog, hail, snow, dust, leaves, petals, or the like. As a result, the position deriver 130 derives the horizontal distance l and the vertical distance h of the floating object.

To address this, the distance condition determiner 132 excludes the obstacle corresponding to the floating object from the objects to be displayed in the attention image 112a. The volume of such a floating object is insignificant. Accordingly, the distance condition determiner 132 identifies an obstacle having a low intensity of electromagnetic waves reflected from the LiDAR as a floating object, and excludes the obstacle from the objects to be displayed in the attention image 112a.

Further, floating objects do not remain stationary. Accordingly, if an obstacle is not recognized continuously for a short period of time, for example, if an obstacle is not present at the same position continuously for two frames, the distance condition determiner 132 identifies the obstacle as a floating object and excludes the obstacle from the objects to be displayed in the attention image 112a.

The pilot can easily recognize obstacles around the airframe even in poor-visibility conditions caused by rain, fog, hail, snow, dust, leaves, petals, or the like. As a result, the pilot can avoid making contact with the obstacles, resulting in improved safety.

Although a preferred embodiment of the present invention has been described with reference to the accompanying drawings, it is needless to say that the present invention is not limited to the embodiment. It will be apparent to those skilled in the art that various changes and modifications can be made without departing from the scope as defined by the appended claims and that such changes and modifications also fall within the technical scope of the present invention.

For example, in the embodiment described above, a helicopter (rotary-wing aircraft) has been described as an example of the aircraft 1. However, the aircraft 1 is not limited to this and may be any machine that flies in the air. When an airplane is adopted as the aircraft 1, thrust generated through an internal combustion engine generates lift around a fixed wing fixed to the airframe. The lift keeps the airframe aloft in the air.

A series of processes performed by each device (for example, the aircraft 1 or the controller 120) according to the present embodiment described above may be implemented by using any of software, hardware, or a combination of software and hardware. A program forming the software is stored in advance in, for example, a non-transitory storage medium (non-transitory media) provided inside or outside each device. For example, the program is read from a non-transitory storage medium (for example, a ROM) to a transitory storage medium (for example, a RAM) and is executed by a processor such as a CPU.

It is possible to create a program for implementing the functions of each of the devices described above and install the program in a computer of each of the devices. In response to the processor executing the program stored in the memory, the processing of each of the functions is executed. At this time, the program may be shared and executed by multiple processors, or the program may be executed by a single processor. Alternatively, the functions of each of the devices described above may be implemented by cloud computing using multiple computers coupled to each other via a communication network.

The program may be distributed from an external device via a communication network and provided and installed in the computer of each device. Alternatively, the program may be stored in a non-transitory computer-readable storage medium (non-transitory computer readable medium) and provided and installed in the computer of each device via the storage medium.

Further, the present embodiment can provide a program for executing processing of the functions of each of the devices described above. In addition, a non-transitory computer-readable storage medium storing the program described above can also be provided. The non-transitory storage medium may be, for example, a disk-type storage medium such as an optical disk, a magnetic disk, or a magneto-optical disk, or may be a semiconductor memory such as a flash memory or a USB memory.

REFERENCE SIGNS LIST 1 aircraft
112 display
114 sound output unit
118 information acquirer
120 controller
130 position deriver
132 distance condition determiner
134 display controller
136 output controller

The invention claimed is:

1. An aircraft comprising:
a rotary wing comprising a main rotor and a tail rotor;
a drive unit configured to rotate the rotary wing;
an information acquirer configured to acquire position information of an obstacle relative to the aircraft;
a display; and
a controller,
the controller comprising:
one or more processors; and
one or more memories coupled to the one or more processors,
the one or more processors being configured to execute processing comprising:
deriving a direction, a horizontal distance, and a vertical distance of the obstacle with respect to the aircraft, based on the position information of the obstacle;
determining, for one or both of the main rotor and the tail rotor, whether the direction, the horizontal distance, and the vertical distance satisfy a first distance condition; and
displaying an index corresponding to the vertical distance at a display position on the display when the first distance condition is satisfied, the display position being identified by the direction and the horizontal distance.

2. The aircraft according to claim 1, wherein the one or more processors are configured to execute processing of excluding the obstacle from objects to be displayed on the display, the obstacle corresponding to a structure forming the aircraft.

3. The aircraft according to claim 1, wherein the one or more processors are configured to execute processing of excluding the obstacle from objects to be displayed on the display, the obstacle corresponding to a floating object.

4. The aircraft according to claim 1, wherein the one or more processors are configured not to use, as a determination target range, a predetermined angle range larger than −90° and smaller than +90° with respect to a heading.

5. The aircraft according to claim 1, further comprising a sound output unit, wherein
the processing further comprising:
determining whether the horizontal distance and the vertical distance satisfy a second distance condition; and
causing the sound output unit to output a sound corresponding to the horizontal distance and the vertical distance when the second distance condition is satisfied.

6. The aircraft according to claim 1, wherein the first distance condition is different between the main rotor and the tail rotor.

7. A system for acquiring position information of an obstacle relative to an airframe comprising a rotary wing and a drive unit configured to rotate the rotary wing, the rotary wing comprising a main rotor and a tail rotor, the system comprising:
   a display; and
   a controller,
   the controller comprising:
   one or more processors; and
   one or more memories coupled to the one or more processors,
   the one or more processors being configured to execute processing comprising:
   deriving a direction, a horizontal distance, and a vertical distance of the obstacle with respect to the airframe, based on the position information of the obstacle;
   determining, for one or both of the main rotor and the tail rotor, whether the direction, the horizontal distance, and the vertical distance satisfy a first distance condition; and
   displaying an index corresponding to the vertical distance at a display position on the display when the first distance condition is satisfied, the display position being identified by the direction and the horizontal distance.

* * * * *